(12) United States Patent
Fessler et al.

(10) Patent No.: US 7,155,218 B1
(45) Date of Patent: Dec. 26, 2006

(54) METHOD AND SYSTEM FOR DETERMINING SPURIOUS EMISSION OUTPUT BY A WIRELESS TERMINAL

(75) Inventors: Braden John Fessler, Lee's Summit, MO (US); Chris Hiesberger, Leawood, KS (US); Nick Baustert, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 475 days.

(21) Appl. No.: 10/414,515

(22) Filed: Apr. 15, 2003

(51) Int. Cl.
*H04Q 7/20* (2006.01)
(52) U.S. Cl. .................. 455/424; 455/425; 455/67.13
(58) Field of Classification Search ........ 455/423–425, 455/67.11, 67.13, 67.7; 375/224, 228
See application file for complete search history.

(56) References Cited

U.S. PATENT DOCUMENTS 6,393,372 B1 * 5/2002 Rzyski ................... 702/111

* cited by examiner

*Primary Examiner*—Lee Nguyen

(57) ABSTRACT

A method and system for determining spurious emission output by a wireless terminal. A test set may adjust the transmit power setting of the wireless terminal to a first transmit power setting and then to a second transmit power setting. At the first transmit power setting and then at the second transmit power setting, the wireless terminal may transmit a signal over a spread spectrum channel. Also, at the first transmit power setting and then at the second transmit power setting, a spectrum analyzer may measure actual power of the signal transmitted by the wireless terminal. Spurious emission output by the wireless terminal may be characterized as any signals transmitted by the wireless terminal outside of the spread spectrum channel.

20 Claims, 4 Drawing Sheets

METHOD AND SYSTEM FOR DETERMINING SPURIOUS EMISSION OUTPUT BY A WIRELESS TERMINAL

BACKGROUND

1. Field of Invention

This invention relates to wireless communication and more particularly to an improved method and system for determining spurious emission output by a wireless terminal.

2. Description of Related Art

A relatively recent advance in telecommunication technology is an ability for people to use wireless terminals to communicate with others. The wireless terminal can take a variety of forms. The wireless terminal may be, for example, a cellular phone, a pager, a personal digital assistant (PDA), a portable computer with wireless modem, or a fixed wireless terminal.

A wireless network, alone or together with one or more other networks, communicatively couples the wireless terminal to a remote terminal, e.g., another cellular telephone, pager, PDA, portable computer with wireless modem, or fixed wireless terminal. The wireless network typically has a base station that produces a radiation pattern. The radiation pattern defines a coverage area of the wireless network. The wireless terminal exchanges signals with the base station within the coverage area of the wireless network. The base station, in turn, facilitates exchange of the signals with the remote terminal, thereby allowing communication between the wireless terminal and the remote terminal.

There may be signal interference present over the air interface. The signal interference is typically caused by unauthorized devices transmitting within the coverage area of the wireless network. To overcome the signal interference, the base station may adjust a transmit power setting of the wireless terminal, i.e., instruct the wireless terminal to adjust a transmit power at which the wireless terminal transmits signals. The wireless terminal may be set to transmit signals at a high transmit power given a high amount of signal interference over the air interface. In contrast, the wireless terminal may be set to transmit signals at a low transmit power given a low amount of signal interference over the air interface. As a result, the wireless terminal may transmit signals at a plurality of transmit powers settings during operation.

The signals that the wireless terminal transmits should be confined to a spread spectrum channel. The spread spectrum channel may be defined by, for instance, a range of frequencies spanning 1.25 MHz. Frequencies between 1850 MHz and 1990 MHz defines a personal communication service (PCS) band. The spread spectrum channel may be located within the PCS band, but could also be located in some other band.

Certification houses typically measure spurious emission output by a wireless terminal. Spurious emission output by the wireless terminal is any signals transmitted by the wireless terminal, outside of the spread spectrum channel which the wireless terminal is supposed to transmit signals. The spurious emission can be produced in a variety of ways. The wireless terminal can have a power amplifier. The power amplifier amplifies signals for transmission over the spread spectrum channel. In amplifying the signals for transmission, the power amplifier may add unwanted transient, high power noise to the signal. The transient, high power noise may be produced at harmonics of a carrier frequency of the spread spectrum channel, thus causing the wireless terminal to transmit signals outside of the spread spectrum channel. The signals transmitted outside of the spread spectrum signal are spurious emission output by the wireless terminal. Other reasons why a wireless terminal produces spurious emission are also possible.

Telecommunications Industry Association/Electronics Industry Association (TIA/EIA) has promulgated a standard (TIA/EIA-98) that defines a test that certification houses can use to determine the spurious emission output by a wireless terminal. TIA/EIA-98 describes instructing the wireless terminal to transmit signals, over a spread spectrum channel, at a maximum transmit power setting. Then, a determination is made as whether the wireless terminal produces any spurious emission. Certification houses that test for spurious emission output by the wireless terminal actually instruct the wireless terminal to transmit signals at the maximum transmit power setting over not one, but two or three different spread spectrum channels. Then, the certification houses measure the spurious emission output by the wireless terminal for the different spread spectrum channels. Performance of the wireless terminal is characterized in terms of the spurious emission output by the wireless terminal for the two or three different spread spectrum channels.

SUMMARY

The present invention stems from a realization that the existing method for determining spurious emission output by the wireless terminal, by the wireless terminal transmitting signals at the maximum transmit power setting, does not properly characterize the potential for a wireless terminal to produce spurious emission. The base station is capable of adjusting the transmit power setting of the wireless terminal through a plurality of transmit power settings. The wireless terminal may produce spurious emission at these other transmit power settings, in addition to or instead of outputting spurious emission at the maximum transmit power setting. Therefore, there exists a need for an improved method and system for characterizing the spurious emission output by the wireless terminal.

In accordance with an exemplary embodiment of the present invention, a test platform may serially adjust a transmit power setting of the wireless terminal through a plurality of transmit power settings. At each transmit power setting, the spectrum analyzer may measure, over a range of frequencies, actual power of a signal transmitted by the wireless terminal. Based on the measurement, the spectrum analyzer or some other device may provide an indication of spurious emission output by the wireless terminal.

The wireless terminal may be supposed to transmit signals within a spread spectrum channel. The range of frequencies over which the spectrum analyzer measures the actual power of the signal transmitted may be those frequencies outside of the spread spectrum channel. The indication of spurious emission output by the wireless terminal may take a variety of forms. For example, the indication of spurious emission output by the wireless terminal may be frequencies, if any, at which the power of the signal transmitted exceeds a threshold level. Alternatively, the indication may be whether the power of the signal transmitted exceeds the threshold level, for the range of frequencies. Still alternatively, the indication may be a maximum power of the signal transmitted by the wireless terminal, for the range of frequencies. Other indications of spurious emission output by the wireless terminal are also possible.

The test platform may automatically and serially adjust the transmit power setting of the wireless terminal from a first transmit power setting, through at least one intermediate transmit power setting, and then to a second transmit power setting. The test platform may consider the power of the signal transmitted by the wireless terminal, for each serially adjusted transmit power setting, in determining the spurious emission output by the wireless terminal. Additionally, the spectrum analyzer may measure the power of the signal transmitted by the wireless terminal a plurality of times for each of the plurality of transmit power settings. The test platform may consider the power of the signal transmitted by the wireless terminal, as measured by the spectrum analyzer the plurality of times, in determining the spurious emission output by the wireless terminal.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
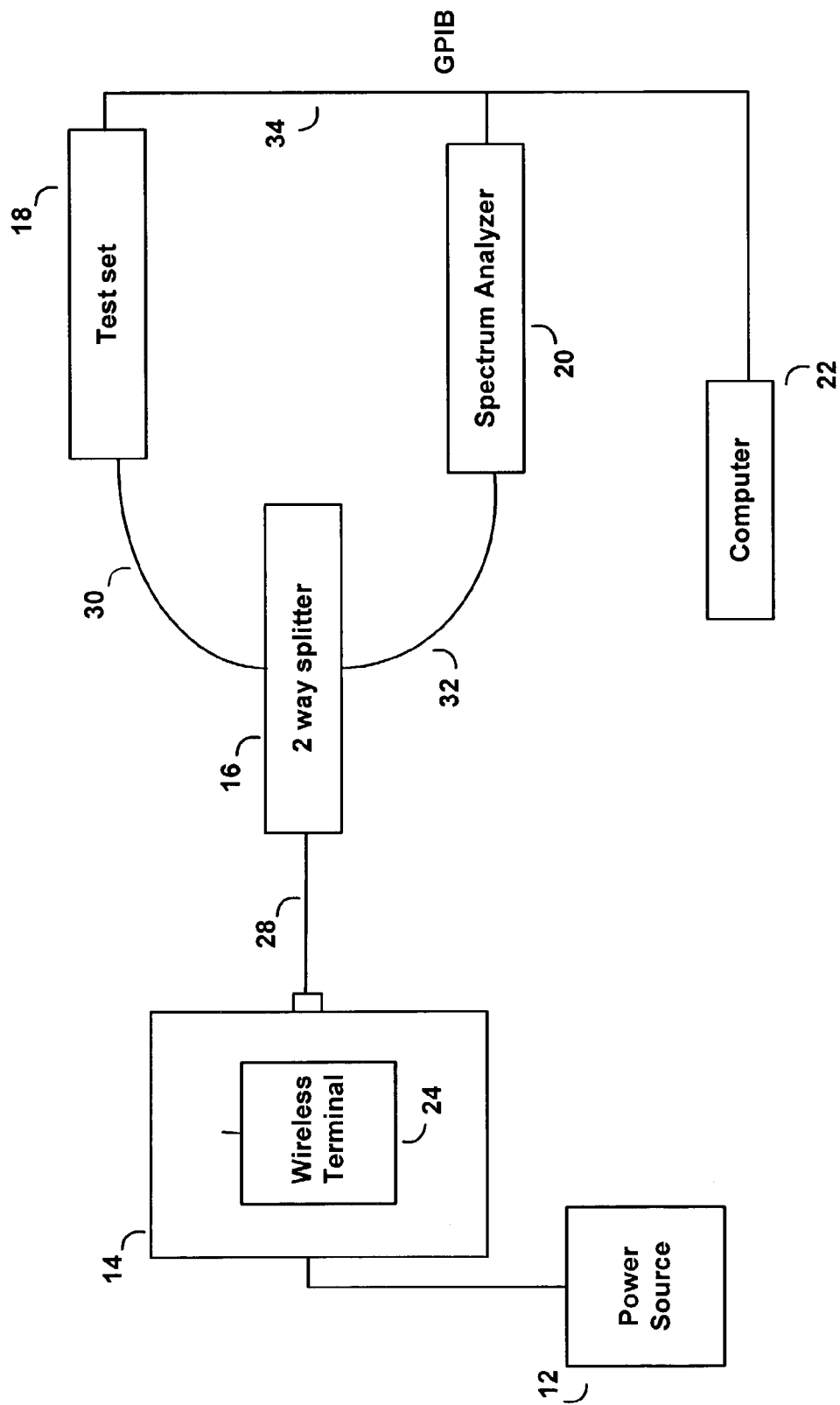
FIG. 1 illustrates an exemplary test platform for determining spurious emission output by a wireless terminal.

FIG. 1 illustrates a test platform in which exemplary embodiments of the present invention may be employed. Those skilled in the art will appreciate that the test platform can take other forms. For example, additional elements may be added to the test platform and some elements may be omitted from the test platform. Further, those skilled in the art will appreciate that many of the elements described herein are functional entities that may be implemented as discrete components or in conjunction with other components, in any suitable combination and location. Still further, the various functions described herein may be carried out by hardware logic or by a processor programmed to execute computer instructions, e.g., software or firmware, stored in memory. Provided with the present disclosure, those skilled in the art can readily design the hardware logic or prepare the computer instructions necessary to perform the various functions.

Referring to FIG. 1, the test platform may include a power source 12, a shield box 14, a two-way splitter 16, a test set 18, a spectrum analyzer 20, and a computer 22. These elements of the test platform may facilitate determination of spurious emission output by a wireless terminal 24. Of course, other arrangements are also possible consistent with the exemplary embodiments of the present invention, to be described herein.

The wireless terminal 24 may be a processor-based device such as the cellular telephone, the pager, the PDA, the computer with wireless modem, or the fixed wireless terminal. The wireless terminal 24 may facilitate wireless communication with a remote terminal (not shown). Indeed, the wireless terminal 24 may take the form of any number of other devices that allows for wireless communication with the remote terminal.

The power source 12 may supply power to the wireless terminal 24. The power source 12 may be a direct current (DC) power source or an alternating current (AC) power source, depending on power supply requirements of the wireless terminal 24.

The shield box 14 may surround the wireless terminal 24. The shield box 14 may have shielding properties so as to isolate the wireless device 24 from radio frequency signals external to the shield box 14. Additionally, the shield box 14 may direct a signal transmitted by the wireless terminal 24 to be carried by link 28 to a two-way splitter 16. In turn, the two-way splitter 16 may split the signal carried by the link 28 so that the signal can be sent over links 30, 32. The links 30, 32 may carry the signal from the wireless terminal 24 to the test set 18 and the spectrum analyzer 20, respectively.

The test set 18 may simulate a base station in a wireless network. The test set 18 may send a signal to the wireless terminal 24, e.g., through links 28, 30, and into the shield box 14. The signal may instruct the wireless terminal 24 to adjust its transmit power setting. The wireless terminal 24 may receive the signal and responsively adjust its transmit power setting. The transmit power setting may correspond to a power at which the wireless terminal 24 should transmit a signal. Additionally, the signal may instruct the wireless terminal 24 to transmit over a spread spectrum channel. The wireless terminal may receive the signal and responsively transmit over the spread spectrum channel.

The test set 18 may be an Agilent 8960 Series 10 E-5515C wireless communication test set. Such a test set 18 is capable of signaling the wireless terminal 12 to adjust its transmit power setting and verify by way of links 28, 30 that the wireless terminal 24 has adjusted its transmit power setting. Indeed, other types of test sets made by a same or different manufacturer may be used for signaling the wireless terminal 24 to adjust its transmit power setting or, for that matter, to transmit over a particular spread spectrum channel.

The spectrum analyzer 20 may measure power of the signal transmitted by the wireless terminal 24 over a range of frequencies. Additionally, the spectrum analyzer 20 may send to the computer 22, data representative of the power of the signal transmitted by the wireless terminal 24 over the range of frequencies. The spectrum analyzer 20 may have functions, in addition to, or instead of those described herein, depending on capabilities of the spectrum analyzer 20.

Link 34 may couple the computer 22 to the spectrum analyzer 20 and to the test set 18. The link 34 may be general purpose interface bus (GPIB). The computer 22 may run a test program that determines the spurious emission output by the wireless terminal 12. As described in more detail below, the test program may signal the test set 18 through the link 34 to serially adjust the transmit power setting of the wireless terminal 24. In turn, the test set 18 may signal the wireless terminal 24 to adjust its transmit power setting. Likewise, the test program may instruct the wireless terminal, by way of the test set 18, to transmit a signal over a particular spread spectrum channel. In turn, the wireless terminal 24 may transmit any signals over the particular spread spectrum channel.

As noted, the computer 22 may adjust the transmit power setting of the wireless terminal through a plurality of transmit power settings. For each transmit power setting, the computer 22 may signal the spectrum analyzer 20 to measure the power of the signal transmitted by the wireless terminal 12 over a range of frequencies. The spectrum analyzer 20 may measure and send to the computer 22, through link 34, data representative of the power of the signal measured over the range of frequencies. Additionally, for each transmit power setting, the computer 22 may analyze the data, for example, in a spread sheet program like Microsoft Excel.

Figure 2:
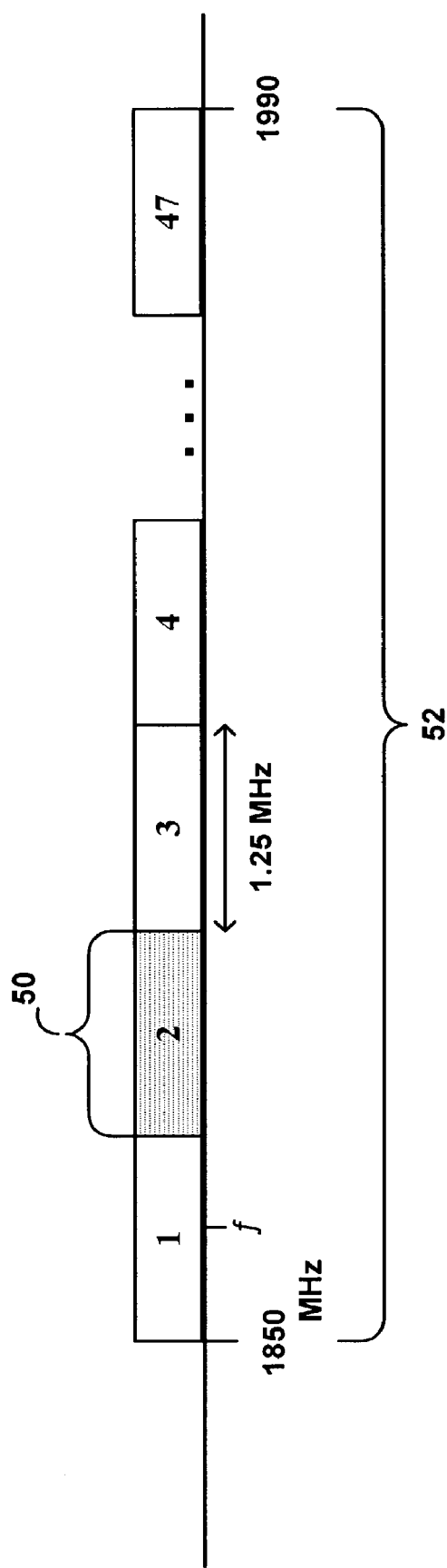
FIG. 2 illustrates an exemplary signal transmitted by the wireless terminal under test.

FIG. 2 illustrates an exemplary signal transmitted by the wireless terminal 24. The wireless terminal 24 may be instructed, e.g., by the test set 18, to transmit signals over a particular spread spectrum channel 50. The spread spectrum channel 50 assigned to the wireless terminal 24 may be one of a plurality of spread spectrum channels that collectively defines a PCS band 52. The PCS band 52 is a frequency spectrum over which the wireless terminal 24 can exchange signals with a wireless network. The PCS band 52 may span 1850 MHz to 1990 MHz and consist of 47 spread spectrum channels that each spans 1.25 MHz. Of course, the wireless terminal 24 may transmit signals over other bands and the signals may take other forms, in addition to or instead of spread spectrum signals, depending on the wireless terminal 24 and the configuration of the wireless network.

In accordance with an exemplary embodiment of the present invention, a transmit power setting of the wireless terminal 24 may be adjusted to a first transmit power setting and then to a second transmit power setting. The wireless terminal 24 may transmit a signal over a spread spectrum channel, with the transmit power setting adjusted to the first transmit power setting and to the second transmit power setting. Because of design flaws in the wireless terminal 24 and other reasons, the wireless terminal may transmit signals outside of the spread spectrum channel which the wireless terminal is supposed to transmit signals. Thus, the spectrum analyzer 20 may measure actual power of the signal transmitted by the wireless terminal 24 for a range of frequencies. The range of frequencies may be those frequencies outside of the spread spectrum channel. Any signals transmitted outside of the spread spectrum channel may be characterized as spurious emission output by the wireless terminal 24.

Other arrangements are also possible consistent with the exemplary embodiments of the present invention. For instance, the range of frequencies also within the spread spectrum channel may be considered in the determination of spurious emission output by the wireless terminal. The spurious emission output determination may take into account those signals within the spread spectrum channel and outside of the spread spectrum channel.

Figure 3:
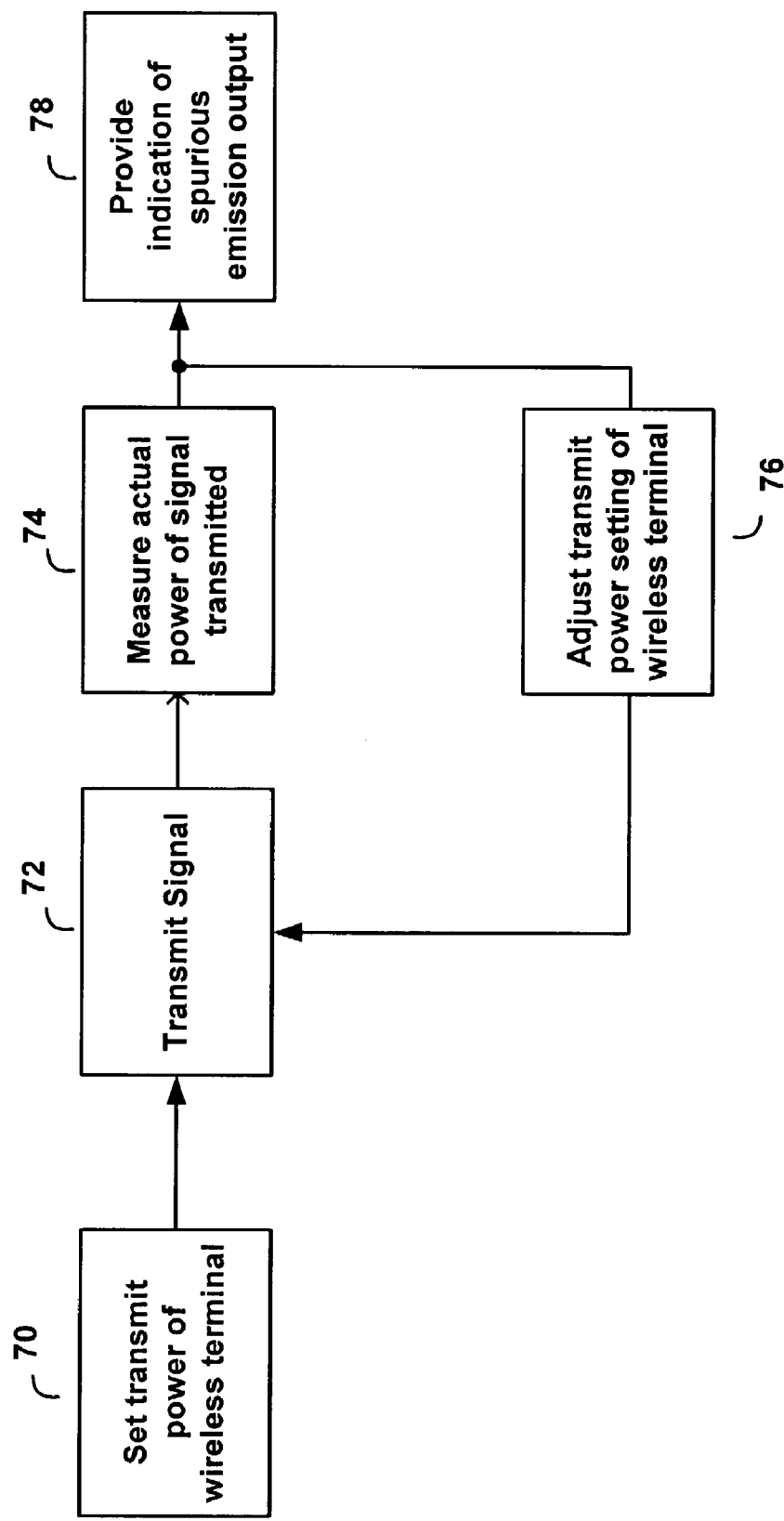
FIG. 3 is a flow chart that illustrates an exemplary process for determining the spurious emission output by the wireless terminal.

FIG. 3 illustrates an exemplary process for determining the spurious emission output by the wireless terminal 24. At step 70, the computer 22 may signal the test set 18 to set the transmit power of the wireless terminal 24 to a particular transmit power setting. The transmit power setting may be a discrete power, for example, ranging from 0 to 25 dBm, at which the wireless terminal 24 should transmit the signal.

In response to the signal from the computer 22, the test set 18 may signal the wireless terminal 24 to set its transmit power to the defined transmit power setting. Responsively, at step 72, the wireless terminal 24 may transmit a signal over the spread spectrum channel. The spread spectrum channel may be a channel within the PCS band, as illustrated by FIG. 2, but other arrangements are also possible depending on a test configuration chosen and the type of signal transmitted by the wireless terminal 24.

At step 74, the computer 22 may signal the spectrum analyzer 20 to measure the actual power of the signal transmitted by the wireless terminal 24. The spectrum analyzer 20 may receive the signal transmitted by the wireless terminal 24 over link 28, 32 and measure the power of the signal transmitted over a range of frequencies. The range of frequencies may preferably span those frequencies outside of the spread spectrum channel which the wireless terminal 24 is supposed to transmit signals. The range of frequencies may span a spread spectrum channel adjacent to the spread spectrum channel which the wireless terminal 24 is supposed to transmit signals or some other portion of the range of frequencies in the PCS band. Additionally or alternatively, the range of frequencies may extend outside of the PCS band, e.g., span frequencies less than 1850 MHz or greater than 1990 MHz. Other variations are also possible.

Preferably, the spectrum analyzer 20 may measure, a plurality of times, the actual power of the signal transmitted, for the range of frequencies. The spectrum analyzer 20 may measure, the plurality of times, the power of the signal transmitted so that transient variations in the power of the signal transmitted can be detected. The spectrum analyzer 20 may measure the power of the signal transmitted ten times for the range of frequencies, but other arrangements are also possible.

At step 76, the computer 22 may signal the test set 18 to adjust the transmit power setting of the wireless terminal 12 to another transmit power setting. The steps 72, 74, 76 may be repeated so that the transmit power setting of the wireless terminal 24 is serially adjusted, for example, incremented from 0 to 25 dBm in +2 dBm steps or decremented from 25 dBm to 0 dBm in −2 dBm steps. Then, the spectrum analyzer 20 may measure, at each of the transmit power settings for the range of frequencies, the power of the signal transmitted by the wireless terminal 24. Other adjustments to the transmit power settings are also possible depending on how the test of spurious emission is performed.

At step 78, and after the test set 18 adjusts the transmit power setting of the wireless terminal 24 a plurality of times, the spurious emission output by the wireless terminal 24 may be determined. As noted above, the spectrum analyzer 20 may measure the power of the signal transmitted over a range of frequencies. The spectrum analyzer 20 may also measure the power of the signal transmitted a plurality of times, for a plurality of transmit power settings. For each measured power, the spectrum analyzer 20 may send data representative of the power of the signal transmitted over the GPIB 34 and to the computer 22. In turn, the computer 22 may analyze the data and provide an indication of any spurious emission output by the wireless terminal 24. The indication of any spurious emission output by the wireless terminal 24 may be based on the range of frequencies over which the spectrum analyzer 20 measured the power of the signal transmitted.

According to an exemplary embodiment of the present invention, the indication of spurious emission output by the wireless terminal 24 may be power of any signals transmitted outside of the spread spectrum channel in which the wireless terminal 24 is supposed to transmit signals. Alternatively, the indication of spurious emission output by the wireless terminal 24 may be a maximum power of any signals transmitted outside of the spread spectrum channel in which the wireless terminal 24 is supposed to transmit signals.

According to an alternative exemplary embodiment of the present invention, the indication of spurious emission output by the wireless terminal may be an indication of one or more frequencies, if any, at which the actual power of the signal transmitted exceeds a threshold level, for the range of frequencies. The threshold level may be the level of background noise outside of the spread spectrum channel. The wireless terminal should not transmit signals outside of the spread spectrum channel beyond the level of background noise. The level of background noise, and thus the threshold level, may be −42 dBm below power of a carrier wave for the spread spectrum channel, but other arrangements are also possible.

If the signal has a power that exceeds the threshold level, so defined, then the wireless terminal outputs spurious emission. The computer 22 may provide, as the indication of the spurious emission output by the wireless terminal, the one or more frequencies at which the power of the signal transmitted exceeds the threshold level. Additionally or alternatively, the computer 22 may provide as the indication of spurious emission output, the power of the signals actually transmitted that exceeds the threshold level. Other arrangements are also possible.

According to yet another exemplary embodiment of the present invention, the indication of spurious emission output may be an indication of whether a maximum power of a signal, if any, transmitted by the wireless terminal exceeds the threshold level. The computer 22 may determine a maximum power of the signal transmitted by the wireless terminal for the range of frequencies. The computer 22 may then compare the maximum power to the threshold level. If the maximum power of the signal meets or exceeds the threshold level, then the wireless terminal 24 outputs spurious emission. The computer 22 may provide, as the indication, the maximum power of the signal or a "YES" response to whether the wireless terminal outputs spurious emission. On the other hand, if the maximum power does not meet or exceed the threshold level, then the wireless terminal 24 might not output spurious emission. The computer 22 may provide, as the indication, no maximum power or a "NO" response as to whether the wireless terminal outputs spurious emission.

As one skilled in the art will realize, other variations are also possible for characterizing the spurious emission output by the wireless terminal. Therefore, the indication of spurious emission output by the wireless terminal may take a variety of forms in addition to, or instead of, those described herein.

In the exemplary embodiment described above, the computer 22 signals the adjustment of the transmit power setting of the wireless terminal 24 and indicates the spread spectrum channel over which the wireless terminal 24 transmits signals. Such functionality can be integrated into the test set 18 so that the test set 18 might not need to receive a signal from the computer 22 to adjust the transmit power setting or to define the spread spectrum channel. Alternatively, the functionality may be even integrated into the wireless terminal 24.

Additionally, in the exemplary embodiment described above, the computer 22 determines the spurious emission output by the wireless terminal 24. Instead of the computer 22 determining the spurious emission output by the wireless terminal 24, the spectrum analyzer 20 may, itself, determine the spurious emission output by the wireless terminal 24. For example, the spectrum analyzer 20 may run the test program, described above as being executed by the computer 22, and provide the indication of spurious emission output by the wireless terminal 24. Other variations are also possible consistent with the exemplary embodiments of the present invention.

Figure 4:
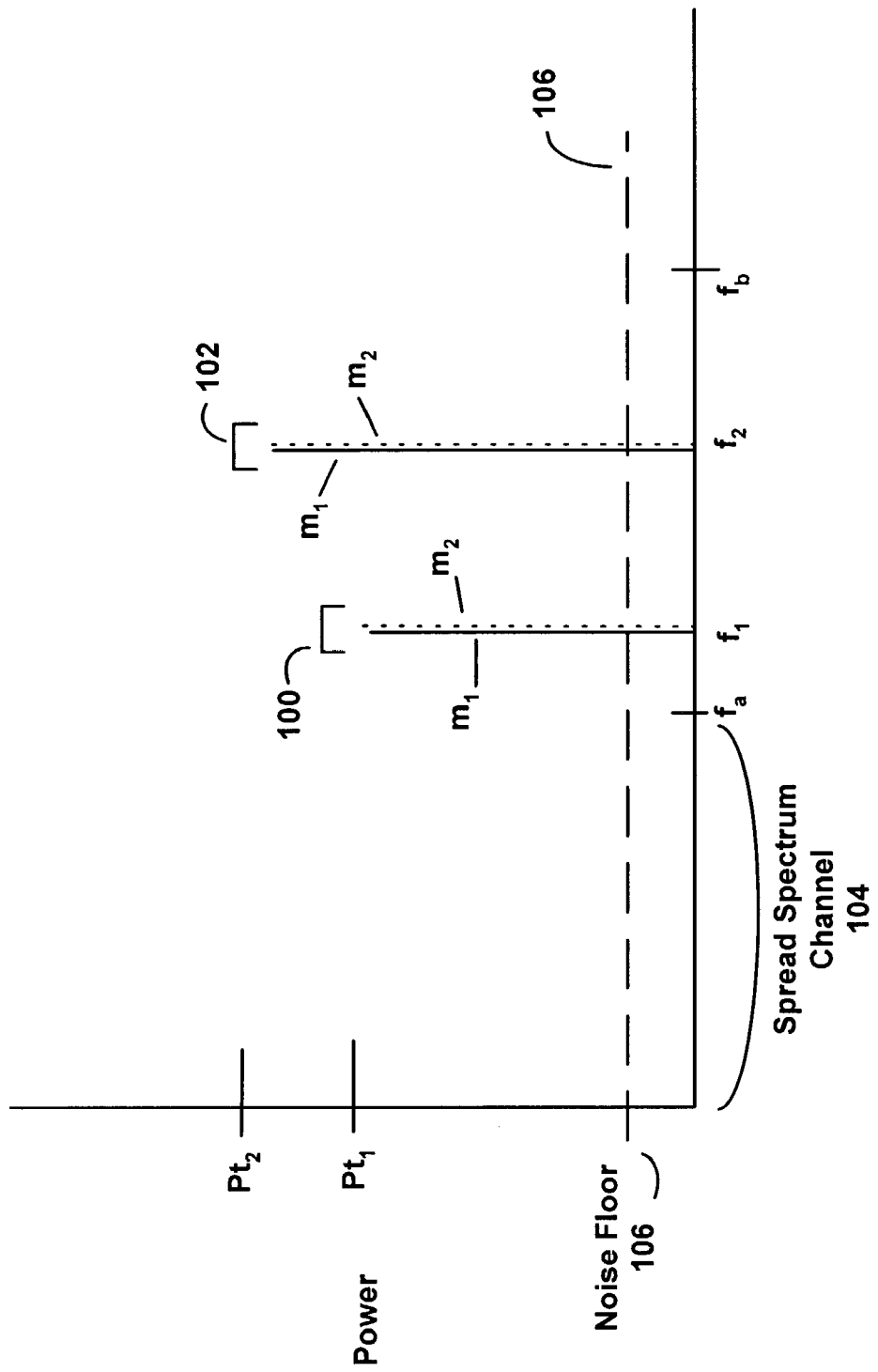
FIG. 4 illustrates, in graphical form, data representative of exemplary signals transmitted by the wireless terminal, as measured by a spectrum analyzer.

FIG. 4 illustrates, in graphical form, the data representative of exemplary signals transmitted by the wireless terminal 24, as measured by the spectrum analyzer 20. The spectrum analyzer 20 may measure the power of signals transmitted at two transmit power settings, for example, transmit power setting $Pt_1$ and transmit power setting $Pt_2$. Additionally, the spectrum analyzer 20 may measure the power of the signals transmitted by the wireless terminal 24 a plurality of times, for example, as represented by measurement $m_1$ and measurement $m_2$. The spectrum analyzer 20 may produce exemplary spectral representations 100 and 102 for a range of frequencies between $f_a$ and $f_b$. The range of frequencies may be those frequencies outside of a spread spectrum channel 104 which the wireless terminal 12 is supposed to transmit signals. The spectral representations 100, 102 may illustrate the power of the signal transmitted for transmit power setting $Pt_1$ and transmit power setting $Pt_2$, respectively, over the range of frequencies between $f_a$ and $f_b$, measured twice.

The indication of spurious emission output by the wireless terminal may be a maximum power of the signals transmitted by the wireless terminal 24, for the range of frequencies. The indication of spurious emission output by the wireless terminal 24 may be $P_{t2}$ in FIG. 4. Alternatively, the indication of spurious emission output by the wireless terminal 24 may be frequencies of the signals transmitted within the range of frequencies. The indication of spurious emission output by the wireless terminal 24 may be $f_1$ and $f_2$ in FIG. 4. Still alternatively, the indication of spurious emission output by the wireless terminal 24 may whether the maximum power of the signal transmitted by the wireless terminal 24 exceeds a noise floor 106. The indication of spurious emission output by the wireless terminal 24 may be YES for FIG. 4. Other arrangements are also possible for providing the indication of spurious emission output by the wireless terminal, in accordance with the exemplary embodiments of the present invention.

A product of (i) how many times the computer 22 signals the spectrum analyzer 22 to measure the power of the signal transmitted by the wireless terminal 24 and (ii) how many times the computer 22 signals adjusting the transmit power of the wireless terminal 24 determines the number of spectral representations produced by the spectrum analyzer 20. In the example above, the computer 22 considers a plurality of four spectral representations in making a determination of spurious emission output by the wireless terminal 24 and providing the indication of spurious emission output by the wireless terminal 24. The computer 22 may consider more or less spectral representations depending on the number of times the spectrum analyzer 20 measures power of the signal transmitted and over how many transmit powers.

Exemplary embodiments of the present invention have thus been illustrated and described. It will be understood, however, that changes and modifications may be made to the invention as described without deviating from the spirit and scope of the invention, as defined by the following claims.

We claim:

1. A method comprising:
    serially adjusting a transmit power setting of a wireless terminal through a plurality of transmit power settings;
    at each transmit power setting, measuring, over a range of frequencies, actual power of a signal transmitted by the wireless terminal; and
    in response to measuring the actual power of the signal, providing an indication of spurious emission output by the wireless terminal, where providing the indication of spurious emission output by the wireless terminal comprises determining a maximum power output by the wireless terminal for the plurality of transmit power settings and determining whether the maximum power output by the wireless terminal exceeds a threshold level.

2. The method of claim 1, wherein measuring the actual power of the signal transmitted by the wireless terminal comprises measuring, a plurality of times, the actual power of the signal transmitted by the wireless terminal.

3. The method of claim 1, wherein serially adjusting the transmit power setting of the wireless terminal comprises automatically adjusting the transmit power setting to a first transmit power setting, through at least one intermediate transmit power setting, and then to a second transmit power setting.

4. The method of claim 3, wherein the first transmit power setting is greater than or equal to 0 dBm, the second transmit power setting is less than or equal to 25 dBm, and the at least one intermediate transmit power setting is between the first transmit power and the second transmit power.

5. The method of claim 1, wherein serially adjusting the transmit setting power of the wireless terminal comprises sending at least one signal to the wireless terminal that causes the wireless terminal to adjust the transmit power setting.

6. The method of claim 1, wherein the range of frequencies is outside of a spread spectrum channel assigned to the wireless terminal.

7. A system comprising:
a test set capable of serially adjusting a transmit power setting of a wireless terminal through a plurality of transmit power settings;
a spectrum analyzer capable of measuring, for each transmit power setting, actual power of a signal transmitted by the wireless terminal, the actual power of the signal being measured over a range of frequencies; and
computer instructions stored in memory and executable by a processor for providing, based on a measurement of the actual power of the signal, an indication of spurious emission output by the wireless terminal, where the indication of spurious emission output by the wireless terminal comprises whether a maximum power output by the wireless terminal exceeds a threshold level.

8. The system of claim 7, wherein the wireless terminal is in a shield box.

9. The system of claim 7, wherein the indication of spurious emission output by the wireless terminal further comprises a maximum power output by the wireless terminal for the plurality of transmit power settings.

10. The system of claim 7, wherein the range of frequencies is outside of a spread spectrum channel assigned to the wireless terminal.

11. The system of claim 7, wherein the spectrum analyzer is further capable of measuring the actual power of the signal transmitted by the wireless terminal a plurality of times.

12. The system of claim 7, wherein the test set being capable of serially adjusting the transmit power setting of the wireless terminal comprises the test set being capable of automatically adjusting the transmit power setting to a first transmit power setting, through at least one intermediate transmit power setting, and then to a second transmit power setting.

13. The system of claim 12, wherein the first transmit power setting is greater than or equal to 0 dBm, the second transmit power setting is less than or equal to 25 dBm, and the at least one intermediate transmit power setting is between the first transmit power and the second transmit power.

14. A system comprising:
a test set capable of serially adjusting a transmit power setting of a wireless terminal through a plurality of transmit power settings;
a spectrum analyzer capable of measuring, for each transmit power setting, actual power of a signal transmitted by the wireless terminal, the actual power of the signal being measured over a range of frequencies; and
computer instructions stored in memory and executable by a processor for providing, based on a measurement of the actual power of the signal, an indication of spurious emission output by the wireless terminal, where the indication of spurious emission output by the wireless terminal comprises a frequency at which a maximum power output by the wireless terminal exceeds a threshold level.

15. The system of claim 14, wherein the wireless terminal is in a shield box.

16. The system of claim 14, wherein the indication of spurious emission output by the wireless terminal further comprises a maximum power output by the wireless terminal for the plurality of transmit power settings.

17. The system of claim 14, wherein the range of frequencies is outside of a spread spectrum channel assigned to the wireless terminal.

18. The system of claim 14, wherein the spectrum analyzer is further capable of measuring the actual power of the signal transmitted by the wireless terminal a plurality of times.

19. The system of claim 14, wherein the test set being capable of serially adjusting the transmit power setting of the wireless terminal comprises the test set being capable of automatically adjusting the transmit power setting to a first transmit power setting, through at least one intermediate transmit power setting, and then to a second transmit power setting.

20. The system of claim 14, wherein the first transmit power setting is greater than or equal to 0 dBm, the second transmit power setting is less than or equal to 25 dBm, and the at least one intermediate transmit power setting is between the first transmit power and the second transmit power.

* * * * *